United States Patent [19]

Eriksson et al.

[11] Patent Number: 5,350,495
[45] Date of Patent: Sep. 27, 1994

[54] METHOD FOR SEPARATING IMPURITIES FROM AN AQUEOUS ALKALI METAL CHLORATE ELECTROLYTE

[75] Inventors: Stina Eriksson, Stöde; Ulla-Kari Holmström, Sundsvall, both of Sweden

[73] Assignee: Eka Nobel AB, Bohus, Sweden

[21] Appl. No.: 57,568

[22] Filed: May 6, 1993

[30] Foreign Application Priority Data

Mar. 9, 1993 [SE] Sweden ................ 9300779-7

[51] Int. Cl.$^5$ ............... C25B 1/24; C01F 11/46
[52] U.S. Cl. ...................... 204/95; 423/163; 423/166; 423/555
[58] Field of Search ............... 204/86, 93, 95; 423/166, 555, 163

[56] References Cited

U.S. PATENT DOCUMENTS

| | | | |
|---|---|---|---|
| 3,970,528 | 7/1976 | Zirngiebl et al. | 204/98 |
| 4,259,297 | 3/1981 | Kaczur et al. | 204/95 |
| 4,636,376 | 1/1987 | Maloney et al. | |
| 4,699,701 | 10/1987 | Lipsztajn | 204/95 |
| 4,702,805 | 10/1987 | Burkell et al. | 204/95 |
| 4,976,936 | 12/1990 | Rathl et al. | 423/555 |
| 5,108,722 | 4/1992 | Ruthel et al. | 204/95 |
| 5,176,801 | 1/1993 | Szanto et al. | |
| 5,215,632 | 6/1993 | Fritts et al. | 204/95 |

*Primary Examiner*—Wayne Langel
*Attorney, Agent, or Firm*—Burns, Doane, Swecker & Mathis

[57] ABSTRACT

The invention relates to a method for separating sulphate from an aqueous electrolyte in an alkali metal chlorate process, thereby reducing the operating cost and increasing the possibility of further closing the electrolytical production of alkali metal chlorate. Calcium ions are added to a portion of the electrolyte, for precipitating calcium sulphate. By adjusting the pH within the range of from 4.6 up to about 7, and combining the temperature, content of ions and the molar ratio between sulphate and calcium ions added in a suitable manner, the calcium sulphate will precipitate predominantly as gypsum and essentially without inclusions and/or co-precipitation of chromium-containing compounds or chlorate. The precipitate is subsequently removed from the portion of electrolyte, whereafter the thus purified portion of electrolyte is recycled to the chlorate process. Any fluoride ions in the electrolyte can also be removed by the addition of calcium ions and a subsequent co-separation of the calcium fluoride precipitated with the calcium sulphate.

10 Claims, No Drawings

METHOD FOR SEPARATING IMPURITIES FROM AN AQUEOUS ALKALI METAL CHLORATE ELECTROLYTE

The invention relates to a method for separating sulphate from an aqueous electrolyte in an alkali metal chlorate process, thereby reducing the operating cost and increasing the possibility of further closing the electrolytical production of alkali metal chlorate. Calcium ions are added to a portion of the electrolyte, for precipitating calcium sulphate. By adjusting the pH within the range of from 4.6 up to about 7, and combining the temperature, content of ions and the molar ratio between sulphate and calcium ions added in a suitable manner, the calcium sulphate will precipitate predominantly as gypsum and essentially without inclusions and/or co-precipitation of chromium-containing compounds or chlorate. The precipitate is subsequently removed from the portion of electrolyte, whereafter the thus purified portion of electrolyte is recycled to the chlorate process.

BACKGROUND

Alkali metal chlorate, and particularly sodium chlorate, is an important chemical in the cellulose industry, where it is used as a raw material in the production of chlorine dioxide, which is an important bleaching chemical for cellulose fibres. Alkali metal chlorate is produced by electrolysis of an electrolyte containing alkali metal chloride according to the overall formula:

$MeCl + 3 H_2O \rightarrow MeClO_3 + 3 H_2$ (Me = alkali metal)

The process is cyclic, where in a first step the chloride electrolyte is brought to an electrolyser for the formation of hypochlorite, whereupon the solution is brought further to reaction vessels for further reaction to chlorate. Subsequently, chlorate formed is separated by crystallization.

The content of impurities must be low in an electrolyte containing chlorate and chloride ions, if the electrolysis carried out in a chlorate cell shall be energy efficient. Thus, calcium, magnesium, sulphate and fluoride ions cause depositions on the cathodes and thereby a higher operating voltage and energy cost. Sulphates and fluorides are also known to damage the anodes, thereby increasing the operating voltage and/or decreasing the lifetime.

Sulphate ions can be removed by addition of calcium ions under alkaline conditions. At a high pH, the calcium sulphate precipitated will contain a substantial amount of chromium-containing compounds and will be difficult to separate and wash. Co-precipitation of chromium-containing compounds means a loss of a valuable chemical and an environmental problem if the sludge containing precipitated calcium sulphate is to be disposed of.

U.S. Pat. No. 4,636,376 discloses a process for removal of essentially chromium-free sulphate from a chromate and sulphate-containing chlorate liquor. The process includes mixing the chlorate liquor having a pH of between about 2.0 and about 6.0 with a calcium-containing material at a temperature and for a time sufficient to form a sulphate-containing precipitate predominantly of glauberite ($Na_2Ca(SO_4)_2$), and separating the glauberite from the chlorate liquor. Removal of sulphate as glauberite, means either a substantial loss of chlorate electrolyte with chromium-containing compounds contained in the precipitated glauberite or dissolution of glauberite in a subsequent washing step.

U.S. Pat. No. 5,176,801 discloses a process for removal of essentially chromium-free sulphate from a chromate and sulphate-containing chlorate liquor. The process comprises the steps of adjusting the pH of the chlorate liquor to within the range of from about 2.5 to about 4.5, mixing the pH-adjusted chlorate liquor with a calcium-containing material at a sufficient temperature and time to form a precipitate of gypsum ($CaSO_4 * 2 H_2O$), and separating the gypsum precipitated from the chlorate liquor. A pH of the chlorate liquor below about 4.5, reduces the product yield due to decomposition of chlorate produced. Furthermore, some of the compounds formed by the decomposition are flammable and/or toxic, e.g. chlorine, various chlorine oxides and chromyl chloride. At a low pH, the fluoride ions present in the electrolyte will be released as hydrogen fluoride. Also, the need for expensive pH control is pronounced since the buffering capacity at a pH below about 4.5 is very limited. Thus, various methods have been proposed to keep the concentration of sulphate in the chlorate process at an acceptable level. Common to these methods is either expensive controlling equipment or excessive loss of chlorate and/or chromium-containing compounds. Also, precipitation at a low pH requires addition of a substantial quantity of acid. Subsequently, a substantial quantity of alkali needs to be added to restore the pH or raise it further. Extensive addition of pH adjusting chemicals is expensive, introduces impurities in the electrolyte and constitutes a substantial risk of decomposition of chlorate due to an instantaneous and local drop in pH.

THE INVENTION

The invention relates to a method for separating sulphate from an aqueous alkali metal chlorate electrolyte, where heat-transfer equipment and advanced instruments for process control can be replaced by precipitation and separation of chemical compounds. The method comprises withdrawing a portion of said electrolyte from said process, adjusting the pH of said portion of electrolyte to within the range of from 4.6 up to about 7, adding calcium ions to said portion of electrolyte for precipitating calcium sulphate. The combination of temperature, content of ions of said portion of electrolyte and the molar ratio between calcium ions added and content of sulphate ions is regulated such that the calcium sulphate essentially precipitates as $CaSO_4 * 2 H_2O$, $CaSO_4 * \frac{1}{2} H_2O$ or $CaSO_4$. Subsequently said precipitated calcium sulphate is removed from the portion of electrolyte, whereafter the purified portion of electrolyte is recycled to the chlorate process.

Thus, the invention concerns a method for separating sulphate from an aqueous electrolyte in an alkali metal chlorate process as disclosed in the claims. The advantages of the present method are besides the comparatively low costs for investment, energy and pH adjustment, also the large flexibility as regards the amount of sulphate that can be removed and the large ratio range of sulphate to calcium ions added.

With the present method, sulphate can be removed efficiently at a negligible loss of chlorate product, due to the limited acidification of the electrolyte and precipitation of a calcium sulphate compound with a very limited solubility in water and aqueous solutions. An effect of this is a greatly reduced hazard of formation of flammable and toxic compounds such as chlorine, various chlorine oxides and chromyl chloride.

With the present method it is also possible to solve the problem of fluoride ions present initially or introduced in the electrolyte e.g. by way of the source containing calcium compounds. Thus, upon addition of calcium ions calcium fluoride will precipitate, which can be removed with the calcium sulphate. This is a substantial improvement compared with known techniques, where the fluoride ions are either released as hydrogen fluoride gas or accumulated in the electrolyte to non-acceptable levels.

The pH at the addition of the calcium ions is decisive for the possibility to precipitate the calcium sulphate as $CaSO_4 * 2 H_2O$, $CaSO_4 * \frac{1}{2} H_2O$ or $CaSO_4$ without sophisticated process control. Before the calcium ions are added, the pH is adjusted to within the range of from 4.6 up to about 7, suitably within the range of from 4.7 up to 6.5 and preferably within the range of from 4.8 up to 5.6.

The pH can be adjusted without addition of chemical agents possibly containing additional impurities, since decomposition of hypochlorite ions in the electrolyte will lower the pH, typically from 6.5 to 5.3. In this case, the variation in pH in the electrolyte will be very limited, thereby reducing the risk of decomposition of chlorate and release of hydrogen fluoride. However, if it is desirable the pH can be lowered to 5 or below by addition of an inorganic acid, suitably hydrochloric acid with a concentration of about 10 to 15 percent by weight.

The calcium ions added to the electrolyte can come from any water-soluble inorganic compound with the exception of calcium sulphate. Suitably, calcium chloride is used since chloride ions can be reacted to chlorate in the electrolysis. Furthermore, the calcium ions are suitably added in an aqueous solution, with a concentration of about 50 up to about 700 g/l, suitably 100 up to 500 g/l calculated as $CaCl_2$.

With the present method it is possible to vary the molar ratio between the calcium ions added and sulphate in the electrolyte within wide limits and still obtain a calcium sulphate which essentially precipitates as $CaSO_4 * 2 H_2O$, $CaSO_4 * \frac{1}{2} H_2O$ or $CaSO_4$ and which is essentially free from chromium-containing compounds, chlorate and sodium-containing compounds. However, the molar ratio can be varied to give a maximum precipitation of sulphate or minimum inclusion and/or co-precipitation of chromium-containing compounds in the precipitate. A high molar ratio between calcium ions added and sulphate increases the degree of precipitation as well as inclusion of chromium-containing compounds and vice versa. The molar ratio between calcium ions added and sulphate in the electrolyte can be in the range of from about 1:3 up to about 3:1. The molar ratio between calcium ions added and sulphate in the electrolyte lies suitably in the range of from 1:2 up to 2:1, preferably from 1:1.5 up to 1.5:1.

The addition of calcium ions at a pH of at least 4.6 makes it possible to efficiently remove fluoride ions normally present in the electrolyte. Thus, to allow also for precipitation of calcium fluoride ($CaF_2$), the amount of calcium ions added should be increased accordingly. The amount of calcium ions added can be chosen to give an excess in the range of from about 0.1 up to about 5 g/l calculated as Ca, suitably from 0.2 up to 3 g/l and preferably from 0.3 up to 2.5 g/l of electrolyte.

The temperature of the electrolyte when precipitating calcium sulphate, influences e.g. the type of calcium sulphate precipitated. To essentially obtain $CaSO_4 * 2 H_2O$ $CaSO_4 * \frac{1}{2} H_2$) or $CaSO_4$, the temperature of the electrolyte should be regulated to within the range of from about 20 up to about 60° C. before adding the calcium ions. The temperature of the electrolyte is suitably regulated to within the range of from 35 up to 55° C. and preferably within the range of from 40 up to 50° C., before adding the calcium ions.

To essentially obtain $CaSO_4 * 2 H_2O$, $CaSO_4 * \frac{1}{2} H_2O$ or $CaSO_4$, the total content of ions and the content of sulphate ions of the treated portion of electrolyte should be regulated in combination with the temperature and ratio between calcium ions added and the sulphate ions of the portion of electrolyte. To reduce the risk of glauberite precipitation, the present method is suitably used to purify alkali metal electrolytes containing from about 3 up to about 20 g sulphate ions/l before precipitation. The concentration of sulphate ions is preferably from 5 up to 16 and more preferably from 6 up to 14 g/l. The concentration of $F^-$ ions can be from about 2 up to about 40 mg/l before precipitation, suitably from 3 up to 25 and preferably from 4 up to 12 mg/l.

The period of time for precipitation of calcium sulphate can be from about 5 min up to about 48 hours, suitably from 15 min up to 24 hours and preferably from 30 min up to 3 hours.

The co-precipitation of chlorate is reduced with increasing temperature of the electrolyte when precipitating calcium sulphate. The co-precipitation of chlorate can also be reduced by sufficient addition of water to the electrolyte.

The calcium sulphate precipitated is removed from the electrolyte with any sufficiently efficient separation method, which can be selected and optimized by the artisan. However, it is advantageous to remove the precipitate from the electrolyte by filtering, since this is a cost effective and efficient method. By carefully selecting and optimizing the filtering conditions, it is also possible to remove a substantial part of the calcium fluoride precipitated.

To enhance the separation of calcium sulphate from the purified portion of electrolyte, the calcium sulphate could be washed thoroughly and the wash liquor suitably recirculated to the precipitation of calcium sulphate. In the washing of the precipitate, it is very important to avoid dissolution of the precipitated calcium sulphate and effectively wash out the chlorate of the electrolyte. This can be achieved by raising the temperature and/or increasing the content of salt in the wash liquor. The wash liquor can be water, optionally purified, or various aqueous solutions containing a salt, e.g. $CaCl_2$, NaCl or $NaClO_3$. The wash liquor is suitably an aqueous solution containing a salt, preferably NaCl. The concentration of NaCl can be from about 30 up to about 300 g/l, suitably from 60 up to 200 g/l. The temperature of the wash liquor can be within the range of from about 10 up to about 70° C., suitably within the range of from 25 up to 65° C. and preferably within the range of from 40 up to 60° C.

A suitable combination of total salt content in the electrolyte, rate of addition of calcium ions and mixing conditions, such as speed and design of the stirrer, should be used to precipitate sulphate and any fluoride ions with minimum inclusion and/or co-precipitation of chlorate and chromium-containing compounds.

The content of chromium-containing compounds in the calcium sulphate after washing, should be as low as possible to reduce environmental impact and excessive loss of a process chemical. On the other hand, the loss of chlorate product, release of flammable and toxic compounds and cost for addition of acid and alkali must be taken into account. The content of chromium-containing compounds is primarily influenced by the conditions prevailing in the precipitation step. Thus, the content of chromium-containing compounds is reduced at a low pH and low total salt content in the electrolyte. However, to reduce the content sufficiently, it is often necessary to wash the precipitate two or more times depending on the purity, volume, pH and temperature of the wash liquor. With the present method, the content of chromium-containing compounds in the calcium sulphate after washing can be less than about 0.5 g/kg, and by suitable optimization, less than 0.2 g/kg. This can be obtained by combining the pH, temperature and total salt concentration in the precipitation step, with carefully selected and controlled conditions in the washing step.

After addition of calcium ions and precipitation and separation of calcium sulphate, the electrolyte normally contains unprecipitated calcium ions. The excess of calcium ions can be reduced and preferentially eliminated by addition of carbonate ions for precipitating and separating calcium carbonate. The pH of the electrolyte must be alkaline for the calcium carbonate to precipitate. The pH is suitably in the range of from 8 up to 13, preferably in the range of from 9 up to 11. Furthermore, it is advantageous that the carbonate ions are in excess of the calcium ions present in the electrolyte, so as to precipitate essentially all calcium ions.

The amount of carbonate ions added is dependent on the concentration of calcium ions and the desired carbonate excess after precipitation. Thus, the amount of carbonate ions added can be chosen to give an excess in the range of from about 0.1 up to 5 g/l, suitably from 0.2 up to 3 g/l and preferably from 0.3 up to 2 g/l.

It is important that essentially all calcium sulphate has been removed from the electrolyte before the carbonate ions are added. Otherwise, the calcium sulphate will start to redissolve.

The source of carbonate ions is not critical, but should be selected to avoid addition of impurities detrimental to the subsequent electrolysis. The source of carbonate ions can be a solution containing alkali metal carbonate, suitably sodium carbonate for economical reasons and for ease of production if sodium chlorate is produced. Furthermore, the source of carbonate ions can be a gas containing carbon dioxide, which upon addition to the alkaline electrolyte reacts to carbonate ions.

The present method can be integrated with the removal of chlorine-containing compounds from the hydrogen or reactor gas scrubbers of a chlorate plant. The alkaline scrubber liquor used, will contain dissolved carbon dioxide from air. By using the alkaline scrubber liquors in the present method the carbonate ions can be advantageously used, while at the same time the excess of carbonate ions is reduced.

After addition of carbonate ions and precipitation and separation of calcium carbonate, the electrolyte normally contains unprecipitated carbonate ions. If carbonate ions are present in the electrolyte they will increase the consumption of acid and caustic in the process and carbon dioxide will be liberated in the electrolysis step and contaminate the hydrogen produced. Therefore, advantageously carbonate is converted to carbon dioxide before the electrolysis step. The pH at the conversion of carbonate to carbon dioxide can be up to about 6.5, suitably in the range of from 3 up to 6 and preferably in the range of from 4 up to 5.5. Subsequently, the electrolyte is stripped of carbon dioxide by a suitable combination of time, temperature, mixing and pressure, which is well known to the artisan. Introduction of a stripping gas is also possible.

The portion of electrolyte withdrawn from the chlorate process can be filtered before the pH is adjusted and calcium ions added, for removing sludge mainly containing iron compounds, but also other impurities like aluminium and manganese. Such prefiltering also reduces the content of chromium-containing compounds in the calcium sulphate subsequently precipitated. The electrolyte is suitably prefiltered with a conventional filter.

The content of hypochlorite ions in the electrolyte is advantageously reduced before the pH is adjusted and calcium ions added, in order to eliminate the release of chlorine and/or various chlorine oxides and decrease the corrosion in subsequent steps. A preselected content can be obtained by agitating or recirculating the electrolyte for a sufficient period of time. Finally, the content of hypochlorite ions can be reduced to a very low level, by electrochemical or catalytic reduction or by addition of a chemical reducing agent such as hydrogen peroxide. If the electrolyte is to be ion exchanged, the content of hypochlorite ions is suitably reduced to less than 0.1 g/l, preferably less than 0.05 g/l.

The present method is used in a process for production of alkali metal chlorates, suitably sodium or potassium chlorate and preferably sodium chlorate.

In the present method, at least a portion of the electrolyte is withdrawn from the chlorate process, purified by precipitation and removal of calcium sulphate, and returned to the process. Also, the total flow of electrolyte can be purified according to the present method. The mode of operation can be continuous or batch-wise.

The invention and its advantages are illustrated in more detail by the following Examples which, however, are only intended to illustrate the invention and not to limit the same. The percentages and parts used in the description, claims and examples, refer to percentages by weight and parts by weight, unless otherwise specified.

EXAMPLE 1

250 liters of chlorate electrolyte containing 95 g NaCl/l and 560 g NaClO$_3$/l was withdrawn from an electrochemical cell of a sodium chlorate producing plant. Initially the pH of the electrolyte was about 7, which was adjusted to 5.0 by addition of HCl. The temperature of the electrolyte was regulated to 47° C. A solution containing 300 g calcium chloride/l was slowly added to the electrolyte under thorough mixing. The molar ratio between calcium ions added and sulphate ions in the electrolyte was 1:1. The residence time was 2 h. The calcium sulphate precipitated was essentially gypsum (CaSO$_4$* 2 H$_2$O). The gypsum and CaF$_2$ precipitated were filtered-off and subsequently washed with water in several steps. The concentration of SO$_4^{2-}$ in g/l and F$^-$ in mg/l of electrolyte before and after precipitation and filtration and the thus obtained reduction, are given in the following Table.

TABLE I

| Compound | Initial concentr. | After filtration | Reduction % |
|---|---|---|---|
| $SO_4^{2-}$ | 15.3 | 2.6 | 83 |
| $F^-$ | 3.9 | 0.7 | 82 |

It is evident from the Table, that precipitation and separation of gypsum and calcium fluoride according to the present process is an efficient way to reduce the content of impurities in chlorate electrolytes. The precipitate was subsequently washed with 1 liter of water per kg of wet precipitate in 4 steps at room temperature. The initial dry weight of the sample was 1000 g. After each step, the effect of washing was analyzed as the weight loss of calcium sulphate. Also, the amount of sodium chloride, sodium chlorate and sodium dichromate washed from the precipitate was analyzed. These compounds were present in the electrolyte accompanying the precipitate. The results are given in the following Table.

TABLE II

| Washing step | Loss of $CaSO_4$ % | Compounds washed from precip. | | |
|---|---|---|---|---|
| | | NaCl g | $NaClO_3$ g | $Na_2Cr_2O_7$ g |
| 1 | 2.5 | 61 | 453 | 0.54 |
| 2 | 4.3 | 0.4 | 7 | 0.06 |
| 3 | 0.8 | <0.4 | 2.2 | <0.01 |
| 4 | 0.7 | <0.4 | <0.1 | <0.01 |
| Total | 8.3 | 62 | 463 | 0.6 |

It is evident from the Table that already three steps gives a very high washing efficiency.

EXAMPLE 2

The electrolyte used in Example 1 was treated in the same manner, except that the molar ratio between calcium ions added and sulphate ions in the electrolyte was 1:2. One sample of calcium sulphate precipitated was washed with water and dried at 50° C. One sample was dried at 50° C. without intermediate washing. To establish type of calcium sulphate precipitated, both samples were analyzed with X-ray ray diffraction. No traces of glauberite were found in either sample.

EXAMPLE 3

1 liter of chlorate electrolyte containing 106 g NaCl/l, 535 g $NaClO_3$/l, 8 g $SO_4^{2-}$/l and 2.4 g $Na_2Cr_2O_7$/l was prefiltered. The pH was adjusted to 4.7 and the temperature was regulated to 50° C. A solution containing 300 g calcium chloride/l was slowly added to the electrolyte under mixing. The molar ratio between calcium and sulphate ions was 1:1. 2 h after the addition was finished, the $CaSO_4$ precipitated was filtered-off and subsequently washed with water in five steps. The resulting content of Cr was 0.26 g/kg of dry precipitate.

EXAMPLE 4

A mixture containing 129 g NACl/l, 550 g NaCl/3l, 30 g $Na_2SO_4$/l and 7.8 g Ca/l was prepared, to establish conditions for glauberite precipitation. The mixture was maintained at a temperature of 67° C. for several days with periodic stirring. The solution was filtered and the filter cake obtained, analyzed with X-ray fluorescence technique. The molar ratio between sulphur and calcium in the precipitate revealed the presence of glauberite.

We claim:

1. A method for separating sulfate from a chromium-containing aqueous electrolyte in an alkali metal chlorate process, comprising the steps of withdrawing a portion of the electrolyte from said process, filtering the withdrawn portion of electrolyte to remove at least a portion of chromium compounds therefrom, thereafter adjusting the pH of said withdrawn portion of electrolyte to within the range of from 4.6 up to about 7, adding calcium ions to said withdrawn portion of electrolyte to thereby effect precipitation of calcium sulfate, regulating the temperature and ion content of said withdrawn portion of electrolyte, and the molar ratio between added calcium ions and sulfate ion content, such that the calcium sulfate essentially precipitates as $CaSO_4 * 2 H_2O$, $CaSO_4 * \frac{1}{2} H_2O$ or $CaSO_4$, removing the precipitated calcium sulfate from the withdrawn portion of electrolyte, thereby purifying said withdrawn portion, and thereafter recycling the purified portion of electrolyte to the alkali metal chlorate process.

2. A method according to claim 1, wherein the molar ratio between added calcium ions and sulfate in the electrolyte is regulated to within the range of from about 1:3 up to about 3:1.

3. A method according to claim 1, wherein the temperature of the electrolyte is regulated to within the range of from about 20 up to about 60° C. before the calcium ions are added.

4. A method according to claim 1, wherein the pH of said withdrawn portion of electrolyte is adjusted to within the range of from 4.7 up to 6.5 before the calcium ions are added.

5. A method according to claim 1, wherein the amount of calcium ions added is regulated to give an excess in the range of from about 0.1 up to about 5 g/l calculated as Ca.

6. A method according to claim 1, wherein, after removal of calcium sulfate, carbonate ions are added to said portion of electrolyte for reducing an excess of calcium ions by precipitating calcium carbonate.

7. A method according to claim 1, wherein a scrubber liquor from a hydrogen or reactor gas scrubber of a chlorate plant is used as the source of carbonate ions.

8. A method according to claim 1, wherein the calcium sulfate removed is washed with an aqueous solution containing a salt, for further separating the withdrawn portion of electrolyte from the sulfate.

9. A method according to claim 1, wherein the alkali metal chlorate is sodium chlorate.

10. A method according to claim 1, wherein the electrolyte contains hypochlorite ions, and wherein the step of adjusting the pH is effected by the decomposition of said hypochlorite ions.

* * * * *